United States Patent
Wells, Sr.

(10) Patent No.: US 8,869,961 B2
(45) Date of Patent: Oct. 28, 2014

(54) UMBILICAL CART AND SYSTEM

(71) Applicant: Fabrication of Rig and Exploration Equipment, Inc., Cleveland, TX (US)

(72) Inventor: David Allen Wells, Sr., Cleveland, TX (US)

(73) Assignee: Fabrication of Rig and Exploration Equipment, Inc., Cleveland, TX (US)

( * ) Notice: Subject to any disclaimer, the term of this patent is extended or adjusted under 35 U.S.C. 154(b) by 0 days.

(21) Appl. No.: 14/143,712

(22) Filed: Dec. 30, 2013

(65) Prior Publication Data

US 2014/0110538 A1      Apr. 24, 2014

Related U.S. Application Data

(63) Continuation of application No. 13/631,159, filed on Sep. 28, 2012.

(51) Int. Cl.

| | |
|---|---|
| *B66C 13/12* | (2006.01) |
| *F16L 3/01* | (2006.01) |
| *E21B 19/08* | (2006.01) |
| *H02G 11/00* | (2006.01) |
| *H02G 1/06* | (2006.01) |

(52) U.S. Cl.
CPC . *F16L 3/01* (2013.01); *E21B 19/08* (2013.01); *H02G 11/00* (2013.01); *H02G 1/06* (2013.01)
USPC ............................................. 191/12 R; 104/89

(58) Field of Classification Search
CPC ........ B64C 37/02; B64D 17/80; B64D 25/00; B61J 3/04; B61B 13/125; H02G 11/003; H02G 11/02; H02G 11/006; H02G 3/0456; H02G 3/263
USPC .......... 104/89, 90, 94, 95; 248/58, 60, 61, 63; 191/12 R, 12.2 R, 12.4, 12.2 A
See application file for complete search history.

(56) References Cited

U.S. PATENT DOCUMENTS

| | | | | |
|---|---|---|---|---|
| 4,102,550 | A | * | 7/1978 | Campbell et al. ............... 299/11 |
| 4,173,373 | A | * | 11/1979 | Campbell et al. ............... 299/11 |

(Continued)

FOREIGN PATENT DOCUMENTS

| | | |
|---|---|---|
| CN | 202210668 | 5/2012 |
| DE | 102009020096 B3 | 5/2010 |
| EP | 1008798 A1 | 6/1999 |

OTHER PUBLICATIONS

Arthur Bolder, PCT Search and Opinion, Apr. 28, 2014.

*Primary Examiner* — Jason C Smith
(74) *Attorney, Agent, or Firm* — Robert C. Rolnik

(57) ABSTRACT

Disclosed is a conduit cart for supporting conduits above at least one rail. The conduit cart has a base; and at least two right-side protrusions, namely, a right-side sub-rail protrusion extending horizontally from the base; and a right-side super-rail protrusion extending horizontally from the base. The right-side sub-rail protrusion and right-side super-rail protrusion are adapted to straddle a flange of a first rail and the first rail is one among the at least one rail. Further, the base has at least two left-side protrusions, namely, a left-side sub-rail protrusion extending in a direction opposite to the right-side sub-rail protrusion from the base; and a left-side super-rail protrusion extending to the right-side super-rail protrusion from the base. The left-side sub-rail protrusion and left-side super-rail protrusion can straddle a substantially horizontal flange of a second rail, and the second rail is among the at least one rail.

14 Claims, 3 Drawing Sheets

(56) References Cited

U.S. PATENT DOCUMENTS

| | | | | |
|---|---|---|---|---|
| 4,372,510 A | * | 2/1983 | Skypala | 248/58 |
| 5,524,548 A | * | 6/1996 | Fox | 104/89 |
| 6,457,418 B1 | * | 10/2002 | Persson | 104/166 |
| 7,677,372 B2 | * | 3/2010 | Maier | 191/12.2 R |
| 7,739,959 B2 | * | 6/2010 | Hutchinson | 104/89 |
| 7,814,839 B2 | * | 10/2010 | Owens et al. | 104/166 |
| 2008/0066640 A1 | * | 3/2008 | Hutchinson | 104/89 |
| 2008/0308281 A1 | | 12/2008 | Boutwell, Jr. et al. | |
| 2009/0026032 A1 | * | 1/2009 | Maier | 191/12.2 R |
| 2009/0200432 A1 | * | 8/2009 | Inoue et al. | 248/51 |
| 2012/0031721 A1 | * | 2/2012 | Glueckhardt et al. | 191/12 R |
| 2013/0233964 A1 | * | 9/2013 | Woodworth et al. | 244/2 |

* cited by examiner

UMBILICAL CART AND SYSTEM

The present application takes benefit of earlier-filed nonprovisional application Ser. No. 13/631,159 filed Sep. 28, 2012, entitled, "Umbilical Cart And System".

BACKGROUND

The present invention relates to cable and other filament management and more specifically to supporting conduits extending from a fixed utility connection.

Deployment of modern drilling rigs accomplish great utility from a very limited operating footprints by drilling multiple boreholes within a tract of the surface estate. Subsequent drilling can be diagonal or lateral in order to reach hydrocarbon bearing formations that are scattered from the main drilling site. Nevertheless, at the conclusion of making a borehole, the drilling rig must be moved laterally to initiate another borehole. This movement permits the vibrations and drilling tools to penetrate the top layers of earth without impacting operations at a previously made borehole.

Moving a drilling rig can be labor intensive and create a period where a drill bit makes no downward progress toward the target formation. During this time, the drill bit is idle and site technicians that move the drill string through the borehole are also idled. This gap in apparent productivity is caused by the need to disconnect utilities and effluent pipes while a rig is moved. Further delays occur due to moving of conduits including fluid carrying conduits into position to where the rig is being moved. Moreover, at such new positions, these conduits need to be reconnected in a safe manner.

Further difficulties can occur when the conduits create new ground-level obstacles to moving people and equipment to the rig, as can occur if electrical cables are left on the ground. Such a location for conduits generally increases risks of trips and other injuries, as well as potential to accidentally sever such cables.

Accordingly, some remedy to the above-described deficiencies is desired.

SUMMARY

According to one embodiment of the present invention discloses conduit cart for supporting at least one conduit above at least one rail. The conduit cart has a base; and at least two right-side protrusions, namely, a right-side sub-rail protrusion extending horizontally from the base; and a right-side super-rail protrusion extending horizontally from the base. The right-side sub-rail protrusion and right-side super-rail protrusion are adapted to straddle a substantially horizontal flange of a first rail and the first rail is one among the at least one rail. Further, the base has at least two left-side protrusions, namely, a left-side sub-rail protrusion extending in a direction opposite to the right-side sub-rail protrusion from the base; and a left-side super-rail protrusion extending in a direction opposite to the right-side super-rail protrusion from the base. Further, the left-side sub-rail protrusion and left-side super-rail protrusion are adapted to straddle a substantially horizontal flange of a second rail, and the second rail is one among the at least one rail. A vertical support extends upwards from the base.

DETAILED DESCRIPTION

Figure 1:
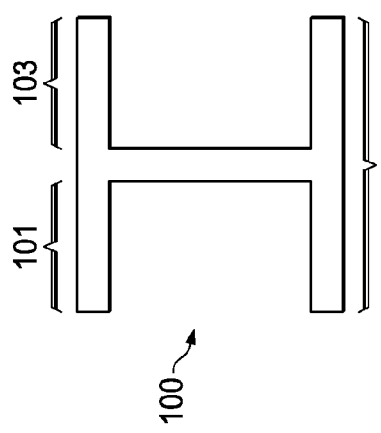
FIG. 1 is a block diagram of a cross-section to an I-beam that may be used as a rail utilized by one or more illustrative embodiments of the invention.

FIG. 1 is a block diagram of a cross-section to an I-beam that may be used as a rail utilized by one or more illustrative embodiments of the invention. Rail 100 can be used to guide cart embodiments along a line that extends generally from a fixed bulkhead where utility and other conduits are available. Rail 100 can reach to and under a drilling rig and, through the cooperation of multiple carts, offer a means to guide one or more conduits to the rig regardless of rig location along the line of current and planned borehole locations. Rail 100 can be placed in parallel with an additional rail if further stability is desired for carts that can ride on such rails.

Rail 100 may rest on terrain, or improved rail-bed using lower surface 105 to bear the weight of the rail and any supporting apparatus. Flange 101 and/or Flange 103 can provided a guide for a cart that has horizontally extending protrusions above and below a flange. The protrusions, in some embodiments may be wheels that each rotate about an axle. The placement of wheels or other protrusions below the flange and generally below corresponding protrusions above the flange, can provide stability for a cart and attendant conduit, especially in high wind conditions.

Figure 2:
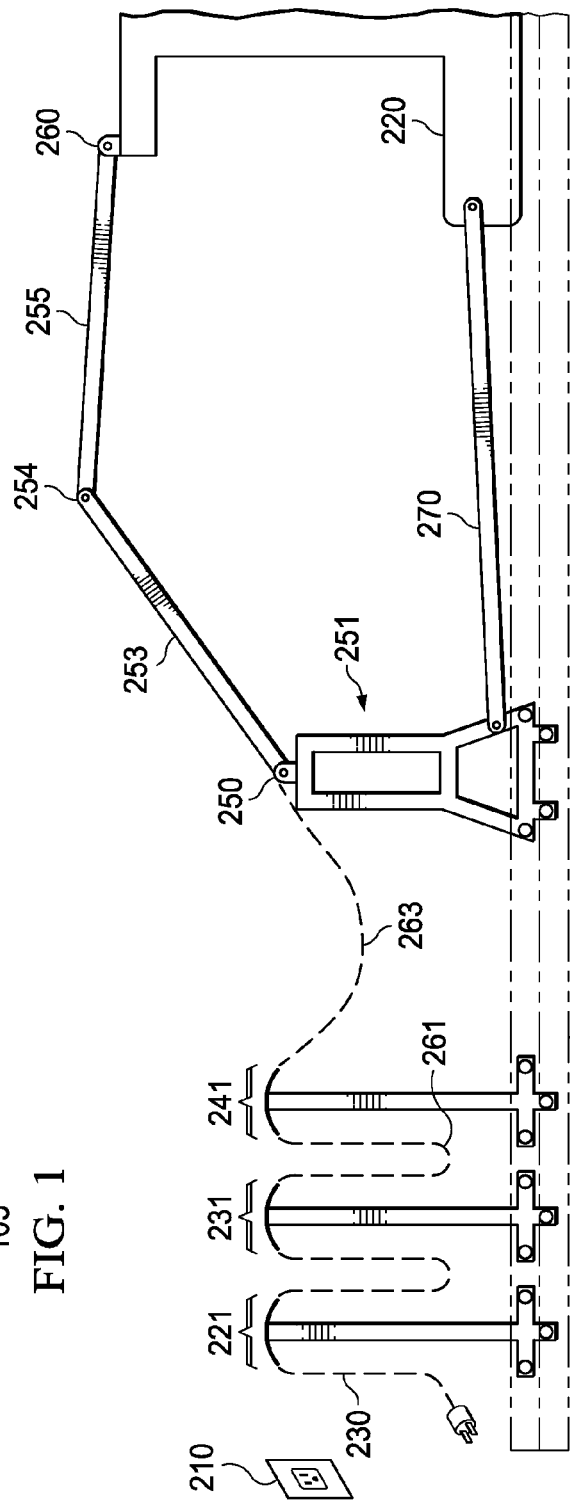
FIG. 2 is a elevation view of plural carts used to elevate a conduit in accordance with an embodiment of the invention.

FIG. 2 is a elevation view of plural carts used to elevate a conduit in accordance with an embodiment of the invention. Rail 200 can be placed along terrain from conduit bulkhead 210 to and beyond the current location of rig 220. Conduit 230 may attach at conduit bulkhead 210 and be draped over plural carts to reach hitched cart 251 that permits the conduit to climb on cable tray 253 and cable tray 255. Cable tray 253 and cable tray 255 may be considered a single cable tray having first end 250 and second end 260, with a joint at or near its center, such as, for example, joint 254. Once the conduit reaches rig 220, it may be semi-permanently attached with comparatively low tension exerted at the rig, as compared to tension placed on the conduit between carts. The tension of conduit at the rig is less than 100 pounds.

Cart 221, cart 231 and cart 241 may be placed sufficiently close to each other, that conduit drapes down toward rail 200. However, one or more suspensions of conduit can be elevated so that the lowest point of sag is above the heads of workers. Accordingly, relatively unobstructed passage under the conduit may be obtained in such a configuration. A height of the arched conduit-support surface from the rail is the tangential distance from the top of the rail to the most distant part of the arched conduit-support surface, excluding any edges or slots that may provide restrictions to lateral movement. Lateral movement is generally horizontal movement tangential to the rail. The height of the arched conduit-support surface can be, for example, nine feet, which allows for 2.5 feet of sagging between arched conduit-support surfaces of adjacent carts. Sags of that much or less generally are above the heads of service personnel that might be operating near the conduits.

Figure 4:
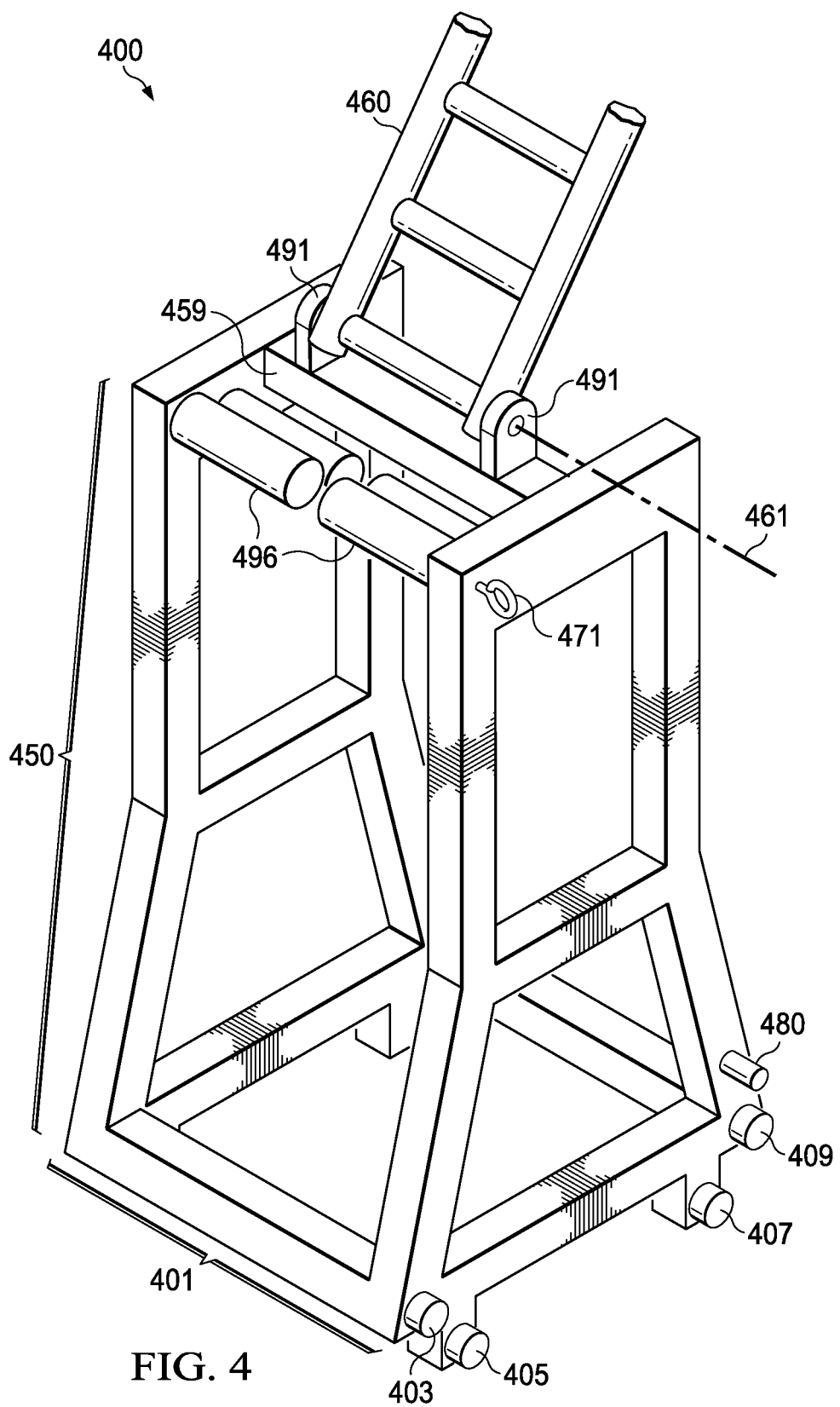
FIG. 4 is a further isometric view of a cart in accordance with another embodiment of the invention.

Hitched cart 251 can be attached to rig 220 via cable trays and via tow-bar 270. Tow-bar 270 may provide a rigid means of transmitting force from a rig that is moving to a new drilling location. As such, tow-bar may attach to hitched cart 251 by a tow-bar attachment point. A tow-bar attachment point is a hitch, axle or other latching mechanism that may extend from a trailer cart, for example, as depicted in FIG. 4, below. It is appreciated that some rigs may have means to provide strain relief to conduits that do not rely on a hitched cart. Accordingly, in some embodiments, conduit may be flexibly attached using one or more carts such as carts 221, 231 and 241.

FIG. 2 shows conduit draped over plural carts where the conduit is supported by arched conduit-support surfaces. An arched conduit-support surface is a part of a cart that provides weight bearing support for one or more conduits. The conduit-support surface may also provide lateral friction or other securing means to prevent wind or other forces from knocking the conduit from atop the arched conduit-support surfaces.

Figure 3:
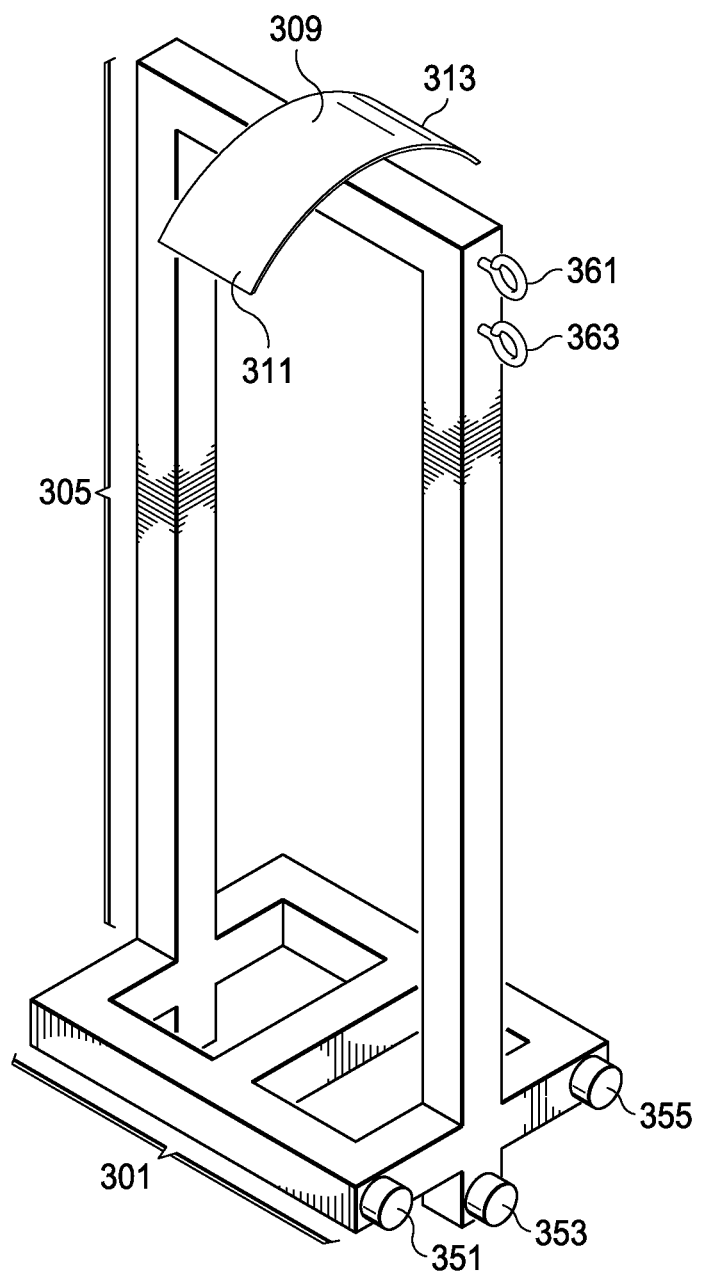
FIG. 3 is an isometric view of a cart in accordance with an embodiment of the invention.

FIG. 3 is an isometric view of a cart in accordance with an embodiment of the invention. A cart is a device that is oriented in a generally upright direction when placed on one or more parallel rails. Cart includes base 301. A base is a generally horizontal assembly that provides a rigid platform for vertical support 305. A vertical support extends vertically above a base to provide vertical and lateral support to conduits that may be placed atop the vertical support, for example, on arched conduit-support surface 309. Arched conduit-support surface 309 allows conduit to drape from lip 311 and from lip 313 in positions that can be a vertical segment 261 or as a tensioned horizontal segment 263, as shown in FIG. 2, above. A lip is the lowest hanging part of the arched conduit-support surface. The lip may provide strain relief for a cable as it hangs in a low tension state. The lips may, accordingly, have tangents that are vertical, which may match the direction of a loose cable and/or conduit as it hangs from a lip.

Base 301 is supported by at least protrusions that extend outward from the base and tangential to a rail. FIG. 3 shows first right-side super-rail protrusion 351 and second right-side super rail protrusion 355. These protrusions may be placed atop a rail flange. Below the rail, the base may extend a right-side sub-rail protrusion 353. The flange may thus be sandwiched between the opposing wheels so that the right side of the cart neither collapses into the terrain nor is tipped by operation of wind or other lateral forces.

On the left side of the cart, similar protrusions may extend. These left-side protrusions are not shown in FIG. 3. These protrusions may be in corresponding, but opposing, orientations to first right-side super-rail protrusion, second right-side super-rail protrusion and right-side sub-rail protrusion. Accordingly, a first left-side super-rail protrusion, second left-side super-rail protrusion and left-side sub-rail protrusion may engage with a second rail that generally parallels rail 200 of FIG. 2.

Each protrusion may be cylindrical or bear a wheel on an axle. Alternatively, one or more protrusions may lack a wheel or even be flat on a side facing the flange. In either case, the protrusions may slidably engage a rail flange, and in particular, permit longitudinal movement of carts along the one or more rails that lead to the rig. Among the super-rail protrusions, each embodiment can have at least one such super-rail protrusion on a side, while the additional second super-rail protrusion is an optional feature. In situations where a protrusion includes a wheel, these wheels may be called left-side wheels or right-side wheels. A wheel is super-rail, if it is oriented to be placed above the rail. A wheel is sub-rail if it oriented to be placed below the rail.

A cart width is a distance between an outermost right-side sub-rail protrusion and an outermost left-side sub-rail protrusion that are coaxial, one to the other. A cart width can be one fifth or less as compared to a vertical support height. A vertical support height is a distance from sub-rail protrusion to a top of an arched conduit-support surface. A maximum clearance distance from the track-level is a distance that a conduit lies from a rail when the conduit is on the top of an arched conduit-support surface. A track level, is the upper-most point on a track upon which a cart rides.

A conduit may be an electrical cable. An electrical cable is a cable that carries electricity along a conductor and has at least one insulator that jackets the conductor. A helical bias is a tendency of a conduit to spiral or curve in a direction that results in a helix pattern in the coil when suspended between points of less than five feet. The helical bias can be that the conduit coils around an axis with a radius of more than one centimeter. An electrical cable can have a helical bias. Any cable bias that is of a radius greater than 50 cm is incidental to cable storage, and is not considered to be an effective bias in an environment where fewer than 20 meters of cable drape between carts. Nevertheless, some embodiments may include a conduit that can be an electrical cable that is substantially unbiased from being helical.

Conduits have limited tensile strength. Accordingly, it is desirable to distribute the tension placed on segments of conduit so that no single draped segment exceeds a tolerance. To provide for limited travel distance between carts, each cart is provided with tether posts. Tether post 361 and tether post 363 permit a high tensile strength cables to be attached that extend, on one hand, upstream to a next cart or other post, and on the other hand, downstream to a next cart or other post. A tether post is an eyelet, post, or other sturdy attachment point that may be suitable to admit a carabineer or other loop at an end to a cable. Additional tether posts may be placed on the hidden side of cart 300. Typically, when deploying a cart system, each segment of conduit is somewhat longer than the high tensile strength cables. A cable is high tensile strength if it can bear more tension without damage than an insulated electricity carrying conduit placed on the cart system. Accordingly, if one cart is pulled in a manner that brings the nearby cable segment nearly horizontal, the high tensile strength cable pulls the neighboring cart closer in a manner to more evenly distribute the tension among conduit segments.

An umbilical system includes at least two carts. Such carts can be, for example, as shown in FIG. 2 as cart 231 and cart 241. Further, the carts can include trailer cart 251. In each case, the umbilical system can include one or more portions of conduit suspended from the carts. A length of conduit suspended between carts is the length of the conduit from arched conduit-support surfaces of adjacent carts or from an arched conduit-support surface to a cable tray support. The length of the conduit suspended between carts can be less than three times a height of the first arched conduit-support surface from the rail.

FIG. 4 is a further isometric view of a cart in accordance with another embodiment of the invention. Cart 400 is a trailer cart, such as, for example, trailer cart 251 of FIG. 2. Cart 400 includes base 401. Base 401 can include a first right side sub rail protrusion 405 and a second right side sub-rail protrusion 407. Further extensions from the right side of base 401 can include a first right side super-rail protrusion 403 and a second right-side super-rail protrusion 409. It is appreciated that fewer than two right-side sub-rails may be used or more than two may be used. Each super-rail protrusion or wheel is at a level higher than the a sub-rail protrusion or wheel height The one or more right side sub-rail protrusion and the right side super-rail protrusion are adapted to straddle a substantially horizontal flange, for example, flange 101 of FIG. 1. The base may also have left-side protrusions that project from the left side of the base, not shown in FIG. 4.

Vertical support 450 can extend upwards from the base. Attached to vertical support 450 may be cable tray 460. Cable tray 460 can rotate about axis 461 to accommodate rigs of varying heights. Cable tray can be, for example, cable tray 253 and 255 of FIG. 1. Cable tray 460 attaches to vertical support 450 by cable tray support 459. The cable tray support is connected to a first end of a cable-tray.

Cable tray dock 491 is provided to permit cable tray 460 to attach to the cart. Cable tray 460 may be secured through an axle extending along axis 461. Optional serpentine routing of cables may be placed through cable posts 496. Such routing can provide friction that prevents a cable from having too much slack as it climbs the cable tray and extends off the cart to a neighboring cart. As such, the cart admits an end of a cable-tray in rotational engagement substantially at a top of the vertical support.

Further tether posts may be provided to cart 400 to provide protection against inadvertent breakage of the cable segments. For example, tether post 471 can provide a tether to the next upstream cart. An additional tether post is hidden on the hidden side of cart 400.

Cart 400 may have tow-bar attachment point capable of accepting a tow device for transmitting force substantially along one or more rails. A tow device can be a rigid bar extending from a mobile drilling rig. A tow device can be a chain or other flexible connector that attaches to a mobile drilling rig. Tow-bar attachment point 480 may be a post, hitch or other attaching or latching means extending from vertical support 450. Alternatively, tow-bar attachment point may attach to base 401.

Accordingly, one or more embodiments may permit the support of conduits above a rail in a manner that may permit draped cables to be pulled taught in individual segments that can clear the heads of workers that operate a drilling rig. As such, the slack conduit so-draped, can be extended to permit zones of relatively unobstructed passage without the need to disconnect or reconnect the conduits in response to moving the drilling rig along a line of linearly placed boreholes.

Embodiments presented herein are illustrative and show examples of how features and limitations may be combined. Still further embodiments are within the spirit and scope of the invention described by the following claims.

What is claimed is:

1. An umbilical system for providing utilities to a rig by suspending conduit above at least one rail, the umbilical system comprising:
 a first cart capable of elevating a first portion of conduit a maximum clearance distance from a level of the at least one rail, the first cart comprising:
 a) a first base;
 b) at least two first cart right-side wheels for slidably engaging a first rail among the at least one rail, each wheel having an axle;
 c) at least two first cart left-side wheels for slidably engaging a second rail among the at least one rail, each wheel having an axle; and
 d) a pair of substantially vertical supports attached to the first base, the pair of substantially vertical supports, joined together at a distal top end, the pair of substantially vertical supports supporting a first arched conduit-support surface entirely above the at least one rail, wherein the first arched conduit-support surface exposes a convex surface upwards and having lips that droop downward;
 a second cart capable of elevating a second portion of conduit the maximum clearance distance from the level of the at least one rail, the second cart comprising:
 a) a second base;
 b) at least two right-side wheels for slidably engaging the first rail among the at least one rail, each wheel having an axle;
 c) at least two left-side wheels for slidably engaging the second rail among the at least one rail, each wheel having an axle; and
 d) a pair of substantially vertical supports attached to the second base, the pair of substantially vertical supports, joined together at a distal top end, the pair of substantially vertical supports supporting a second arched conduit-support surface, wherein the second arched conduit-support surface exposes a convex surface upwards and having lips that droop downward;
 wherein the second rail is substantially parallel the first rail.

2. The umbilical system of claim 1, further comprising: a conduit suspended by the first arched conduit support surface and the second arched conduit support, wherein a length of conduit is suspended there between.

3. The umbilical system of claim 2, wherein the conduit has a helical bias.

4. The umbilical system of claim 2, wherein the conduit lacks a helical bias.

5. The umbilical system of claim 2, wherein the length is shorter than three times a height of the first arched conduit-support surface from the rail.

6. The umbilical system of claim 2 wherein the height of the first arched conduit support surface from the rail is at least nine feet.

7. The umbilical system of claim 2, wherein an end of the conduit is available at a rig, with tension of less than 100 pounds.

8. A conduit cart for supporting at least one conduit above at least one rail, the conduit cart comprising:
 a base;
 a right-side sub-rail protrusion extending horizontally from the base;
 a right-side super-rail protrusion extending horizontally from the base; wherein the right-side sub-rail protrusion and right-side super-rail protrusion are adapted to straddle a substantially horizontal flange of a first rail and the first rail is one among the at least one rail;
 a left-side sub-rail protrusion extending in a direction opposite to the right-side sub-rail protrusion from the base;
 a left-side super-rail protrusion extending in a direction opposite to the right-side super-rail protrusion from the base, wherein the left-side sub-rail protrusion and left-side super-rail protrusion are adapted to straddle a substantially horizontal flange of a second rail, and the second rail is one among the at least one rail; and
 a pair of substantially vertical supports extending upwards from the base, the pair of substantially vertical supports, joined together at a distal top end, the pair of substantially vertical supports to support an arched conduit support arranged to support a portion of the conduit that is in contact with the arched conduit support surface entirely above the rail.

9. The conduit cart of claim 8, wherein the conduit cart further comprises a cable tray dock for admitting an end of a cable-tray in rotational engagement substantially at a top of the pair substantially vertical supports.

10. The conduit cart of claim 9, wherein the cable tray support is connected to a first end of a cable tray, wherein the cable tray has at least one joint between the first end and a second end, the joint permitting rotation of the second end.

11. The conduit cart of claim 8, wherein the right-side sub-rail protrusion comprises at least one right wheel mounted to an axle extending from the base; the right-side super-rail protrusion comprises at least one second super-rail right wheel mounted to an axle extending from the base at a level higher than the first at least one right wheel, and parallel to the first at least one right wheel; the left-side sub-rail protrusion comprises at least one right wheel mounted to an axle extending from the base; the left-side super-rail protrusion comprises a second left super-rail wheel mounted to an axle extending from the base at a level higher than the first left wheel.

12. The conduit cart of claim 11, wherein the at least one right super-rail wheel comprises two right wheels, and the at least one right sub-rail wheel comprises two right wheels.

13. The conduit cart of claim 8, further comprising a tow-bar attachment point capable of accepting a tow device for transmitting force substantially along the first rail.

14. The extendable conduit cart of claim 13, wherein the conduit cart comprises an electrical cable that is substantially unbiased from being helical.

* * * * *